United States Patent [19]

Luc et al.

[11] Patent Number: 4,845,660
[45] Date of Patent: Jul. 4, 1989

[54] PROCESSOR FOR SIGNAL PROCESSING AND HIERARCHICAL MULTIPROCESSING STRUCTURE INCLUDING AT LEAST ONE SUCH PROCESSOR

[75] Inventors: Mary Luc, Bures sur Yvette; Bahman Barazesh, Paris, both of France

[73] Assignee: Telecommunications Radioelectriques et Telephoniques T.R.T., Paris, France

[21] Appl. No.: 161,340

[22] Filed: Feb. 19, 1988

Related U.S. Application Data

[63] Continuation of Ser. No. 765,018, Aug. 12, 1985, abandoned.

[30] Foreign Application Priority Data

Aug. 14, 1984 [FR] France ............................. 84 12800

[51] Int. Cl.⁴ ............................................. G06F 9/00
[52] U.S. Cl. .................................... 364/900; 364/940.7
[58] Field of Search ................ 364/200 MS, 900 MS

[56] References Cited

U.S. PATENT DOCUMENTS 4,215,395  7/1980  Bunyard et al. ............... 364/101
4,224,600  9/1980  Sellner ........................... 364/200
4,498,134  2/1985  Hansen et al. .................. 364/200

Primary Examiner—Gareth D. Shaw
Assistant Examiner—John G. Mills
Attorney, Agent, or Firm—Thomas A. Briody; Jack E. Haken; Jack D. Slobod

[57] ABSTRACT

A processor formed from a signal processing unit operating according to instructions transmitted by a bus line, including a slave section provided with an address/data port for connection to a master signal processing circuit; a first buffer register in which data coming from the master processing circuit via the address/data port can be written and read in order to be processed by the processing unit, a second buffer register in which the data processed by the processing unit can be written, then read in order to be directed via the address/data port to the master processing circuit and a sequential control circuit so that access to these buffer registers is allocated in turn to the processing unit and to the master processing circuit. A master section is also provided intended to be connected to at least one slave circuit.

10 Claims, 15 Drawing Sheets

PROCESSOR FOR SIGNAL PROCESSING AND HIERARCHICAL MULTIPROCESSING STRUCTURE INCLUDING AT LEAST ONE SUCH PROCESSOR

This is a continuation of co-pending application Ser. No. 765,018 filed on Aug. 12, 1985, now abandoned.

BACKGROUND OF THE INVENTION

1. Field of the Invention

The present invention relates to a processor for signal processing provided for integration in a single module and intended to be associated with other signal processing circuits (particularly other processors) to form a hierarchical multiprocessing structure, this processor being formed from a signal processing device operating according to instructions transmitted by an instruction bus line.

2. Description of the Prior Art

In equipment used in telecommunications, for example in modems for data transmission, digital processing of the signal is carried out and the current tendency is to perform all the required functions by means of programmable processors. The digital processing of the signal is characterized by arithmetic operations (addition, subtraction, multiplication, division) executed repetitively on relatively simple data structures. The microprocessors in general use are not suitable for the digital processing of the signal mainly because of their low performance in speed of execution and the inadequacy of their architecture and of their instruction set.

Fully integrated processors are commercially available which are oriented towards signal processing and which are distinguished from general purpose microprocessors by their instruction execution time which is in the order of 250 ns, by the high degree of internal parallelism of operations and by an instruction set suited to the calculations to be made, including, in particular, multiplication.

But in order to perform all the functions required, for example in a modem, transmission, reception, equalization, or echo cancelling, it is usually necessary to associate several signal processor units in order to distribute the tasks to be carried out. Commercial signal processors have only one data access per unit for the data exchanges with the exterior and can only be associated by connecting these accesses to a common data bus such that, throughout the time during which this common bus is being used for exchanges between two processors or between a processor and a memory connected to the bus, the bus is not available for exchanges between other processors. This results in a loss of time and a complicated management of the set of processors, particularly in the case in which certain exchanges take up the majority of the time. This happens, for example, when producing the automatic echo cancelling function in a modem, which necessitates almost continuous exchanges between a RAM memory containing coefficients and the processor which has to update those coefficients.

The invention also relates to a hierarchical multiprocessing structure including at least one such processor.

A tree structure, with a limited number of processors connected to the same data bus, seems more suited to the processing to be carried out in devices of the modem type. Such a structure used for signal processing is described in U.S. Pat. No. 4,096,566. In this known structure, each processor is formed from several modules, a control module and an arithmetic module connected to an internal data bus and a bus adapter module for the connection with another processor. Each control module can perform a master function with respect to one or more control modules and can itself be a slave for a higher level control unit. In this known structure, a single internal bus connects the bus adapter of the master processor to the bus adapter of the slave processor, which does not allow independence between the data exchanged by a processor with its master processor and its slave processor. The data exchanges between master and slave processors are carried out using an interrupt procedure which produces an undesirable loss of time.

SUMMARY OF THE INVENTION

The purpose of the present invention is to palliate these disadvantages and to provide a signal processor formed by a single module of such type that by direct connection of several modules it is possible to construct a hierarchical multiprocessing structure and in such a manner that the data exchanges of one processor with its master and its slave can be carried out simultaneously, in an independent way.

In order to do this a processor of the type mentioned in the preamble is remarkable in that it includes a slave section provided with an address port to be connected in particular to a master signal processing circuit, an input buffer memory in which the data coming from the master processing circuit through the address port can be written and read in order to be processed by the processing unit, an output buffer memory in which the data processed by the processing unit can be written, then read in order to be directed, via the address port to the master processing circuit and a sequential control circuit so that the access to these registers is allocated to said processing unit and to the said master processing circuit.

It stands to reason that all the inputs and outputs given for the invention are compatible with a limited number of pins (typically 48) when the processor is produced in a single module, which enables cheap manufacture.

The following description accompanied by the appended drawings, all given by way of nonlimiting example, will give a better understanding of how the invention can be embodied.

DESCRIPTION OF THE PREFERRED EMBODIMENTS

Figure 1:
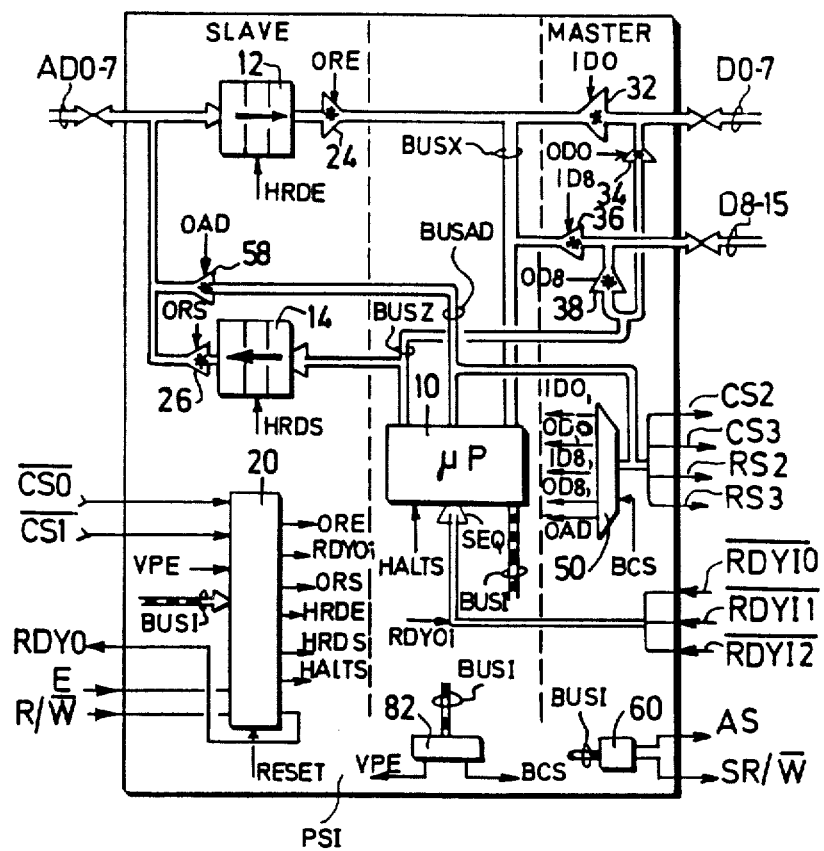
FIG. 1 represents a processor according to the invention.

The processor PSI of the invention shown in FIG. 1 is formed from a signal processing unit 10. This unit includes in particular, as will be described later: an arithmetic and logic unit, random access memories, a program memory containing the instructions for the processing to be carried out and a sequencer which commands the various operations to be carried out. The instructions are carried by a multi-wire line BUSI, address codes by a BUSAD line; input data can be transmitted over a BUSX line and the output data by a BUSZ line. The running of the program within the unit 10 can be modified by signals applied to its SEQ input acting on a control circuit of the sequencer 20. The processor PSI of FIG. 1 in practice is manufactured as a single module including a limited number of pins (typically 48). Among these pins are distinguished three groups of eight ports referenced AD0-7, D0-7 and D8-15. These ports are used for the transmission of data in both directions, i.e. data can be sent from these ports to other circuits and these ports can also receive data from these same circuits. Other pins are used to send various signals CS2, CS3, RS2, RS3, RDY0, AS and SR/$\overline{W}$ and also for receiving signals $\overline{CS0}$, $\overline{CS1}$, E, R/$\overline{W}$, $\overline{RDYI0}$, $\overline{RDYI1}$ and $\overline{RDYI2}$.

According to the invention, to enable connections with other processing circuits, the processor PSI in FIG. 1 includes a SLAVE section provided with AD0-7 ports in order to be connected in particular to a MASTER signal processing circuit, an input buffer memory 12 (first buffer register), for example a FIFO, in which the data coming from the MASTER processing circuit through the AD0-7 port can be written and read in order to be processed by the processing unit, an output buffer memory 14 (second buffer register, for example a FIFO, in which the data processed by the processing unit 10 can be written then read in order to be directed through the AD0-7 port to the MASTER processing circuit and a sequential control circuit 20 in order that access to these registers is allocated to said processing unit and to said MASTER processing circuit.

The set of registers 12 and 14 can be, in the rest of the description, called a "mailbox", this name illustrating clearly the function of register 12 and 14. Registers 12 and 14 are each formed of three elementary 8-bit registers connected in cascade; the appearance of a clock signal HRDE for register 12 and HRDS for register 14 causes the shifting of data from one elementary register to another.

The sequential circuit 20 produces various signals for managing the "mailbox" other than the HRDE and HRDS signals, it provides the ORE and ORS signals for the three state amplifiers 24 and 26 to put them in the passing state or in the high impedance state, a signal RDYO to the processing circuit connected to the SLAVE section and also the HALTS and $\overline{RDYO1}$ signals for the processing unit 10 forming part of the same module as this sequential circuit. The amplifiers 24 and 26 are connected to the outputs of registers 12 and 14.

The HALTS signal in the "on" state commands the stoppage of unit 10. In order to produce these signals, the sequential circuit 20 uses the signals transmitted by the BUSI line from the signals present on pins, $\overline{CS0}$, $\overline{CS1}$, E and R/$\overline{W}$, as well as a VPE signal.

A processor PSI according to the invention can also be a master and for this it also includes a MASTER section including ports D0-7 and D8-15 which can be connected to data line BUSX and BUSZ by means of three state amplifier circuits 32, 34, 36 and 38 provided with controls ID0, OD0, ID8 and OD8. These controls are simply produced by a decoder 50 connected to the BUSAD line. This decoder 50 also provides a signal OAD for commanding a three state ampllifier 58 into the passing state. Thus by software, the processing unit 10 can by means of suitable instructions be connected to ports D0-7 and D8-15. Using signals CS2, CS3, RS2 and RS3 it is possible to select slave processing circuits; the signals RDYI0, RDYI1 and RDYI2 enable the testing of the availability of the slave processing circuits. The signals RDYI0, RDYI1 and RDYI2 as well as the signal $\overline{RDYOi}$ are applied to the control input SEQ of the sequencer of unit 10. A validation circuit 60 provides signals AS and SR/$\overline{W}$; the signal AS validates the addresses in the case in which the data supplied at D0-7 or D8-15 are address codes and the signal SR/$\overline{W}$ controls the recording and reading of data in a distant slave circuit connected to ports D0-7 and D8-15. This validation circuit 60 is controlled by instructions transmitted by the BUSI line.

Figure 2:
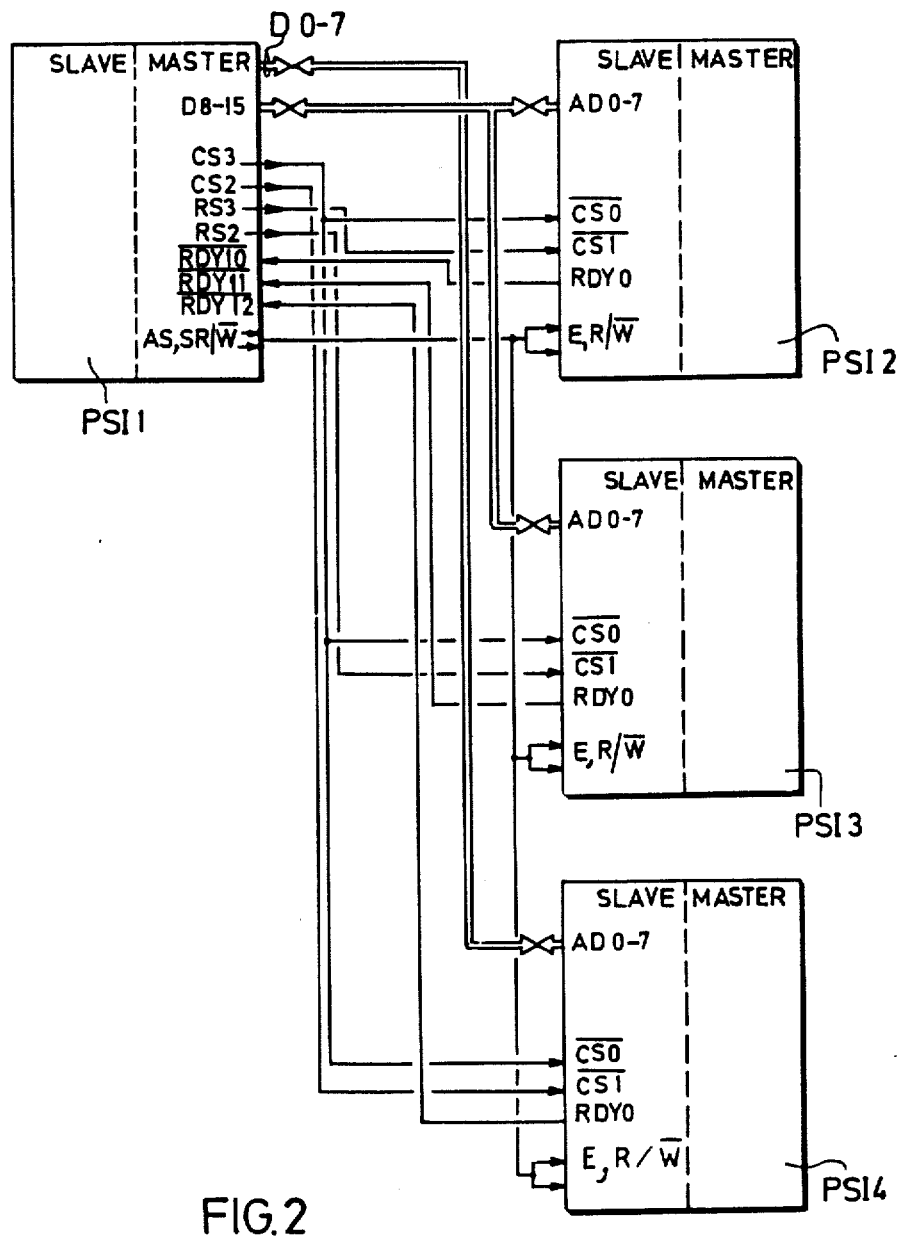
FIG. 2 represents a first example of a hierarchical structure according to the invention.

FIG. 2 shows a first example of a multiprocessing structure including at least the processor PSI described in FIG. 1; this structure is composed of four such processors according to the invention referenced PSI1, PSI2, PSI3 and PSI4 respectively; the D0-7 ports on the MASTER side of the processor PSI1 are connected to the AD0-7 ports of the PSI4; the D8-15 ports of the PSI1 processor are connected to the AD0-7 ports of the processors PSI2 and PSI3; the validation and read-write signals AS, SR/$\overline{W}$ from the processor PSI1 are applied to the inputs E, R/$\overline{W}$ on all the processors PSI2, PSI3 and PSI4. The RDYO outputs of the processors PSI2, PSI3 and PSI4 are connected to inputs $\overline{RDYI0}$, $\overline{RDYI1}$ and $\overline{RDYI2}$ respectively of processor PSI1. These signals at outputs CS3, CS2, RS3, RS2 serve to select one of the processors PSI2, PSI3 and PSI4 during the data exchange process between one of the processors PSI2, PSI3 and PSI4 and the processor PSI1.

Figure 3:
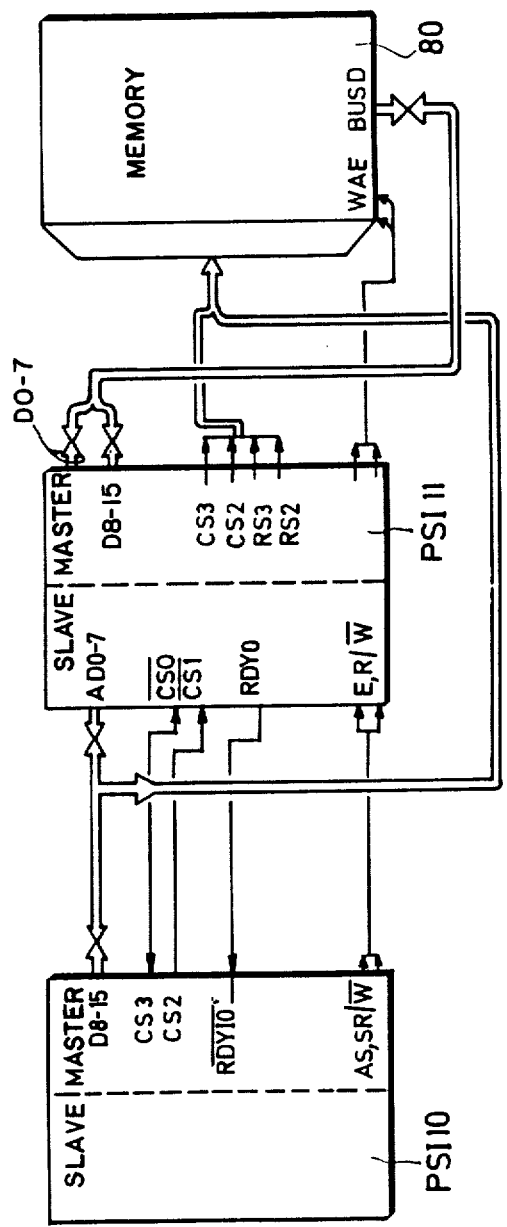
FIG. 3 represents a second example of a hierarchical structure according to the invention.

A second structure example is shown in FIG. 3; this structure includes two processors PSI10 and PSI11 according to the invention and a random access memory (RAM). It should be noted here that the AD0-7 ports of the SLAVE section of the processor PSI11 are used either for the transmission of data between itself and the processor PSI10, or for the transmission of address code for the memory 80. The address field of the memory 80 is further increased in this example by the signals $\overline{CS3}$, $\overline{CS2}$, RS3 and RS2, which extends the address capacity to 8+4, or 12 bits, (i.e. 4k); in addition the D0-7 and D8-15 ports are concatenated in order to be connected to the data bus BUSD of memory 80 organized in 16-bit words; the AS signals and SR/$\overline{\text{W}}$ signals from processor PSI11 are applied to the write control input W and to input AE to put the output of the memory 80 into the low impedance passing condition, it being accepted that this is of the static type. The pins CS3, CS2 of processor PSI10 are connected to pins $\overline{\text{CS0}}$, $\overline{\text{CS1}}$ of processor PSI11 and pins AS, SR/$\overline{\text{W}}$ of PSI10 to pins E, R/$\overline{\text{W}}$ of PSI11. Pins RDY0 and RDY10 of processors PSI11 and PSI10 are interconnected.

Figure 4:
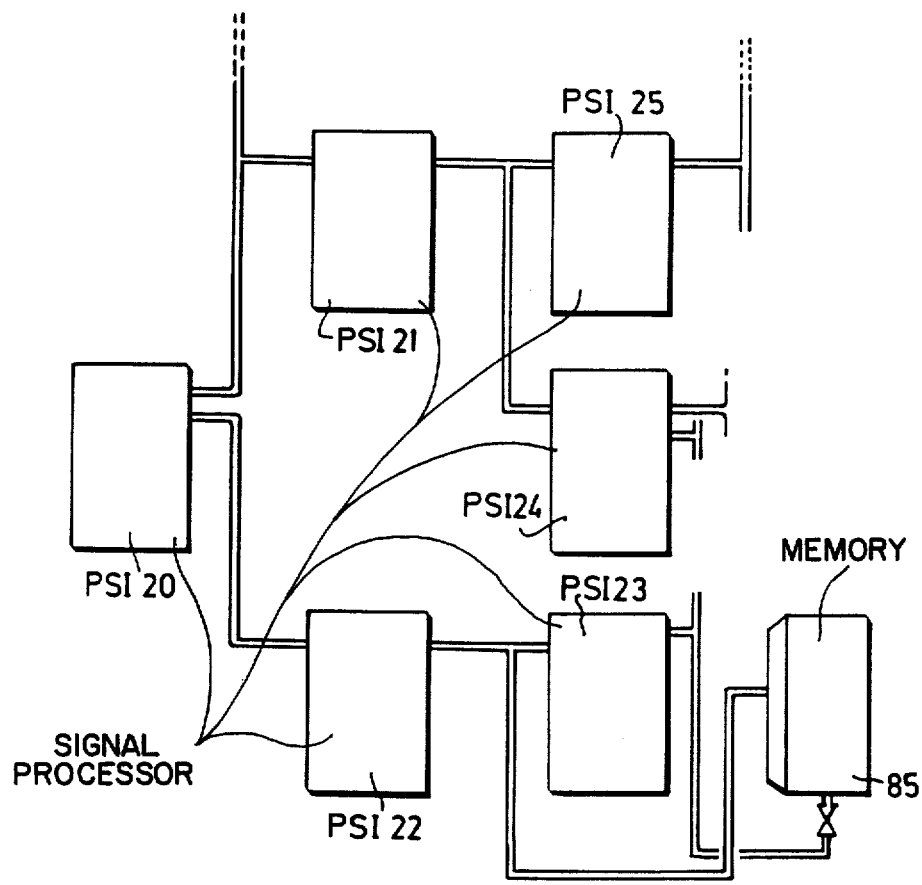
FIG. 4 represents a third example of a hierarchical structure according to the invention.

The processor of the invention allows hierarchical tree structures as represented in FIG. 4. The MASTER section of processor PSI20 can be connected to the SLAVE sections of processors PSI21 and PSI22 of which the MASTER sections can in turn be connected to the SLAVE sections of other processors. Processor PSI21 is connected to processors PSI25 and PSI24. Processor PSI22 is connected to processor PSI23 which can also address a memory 85.

Figure 5:
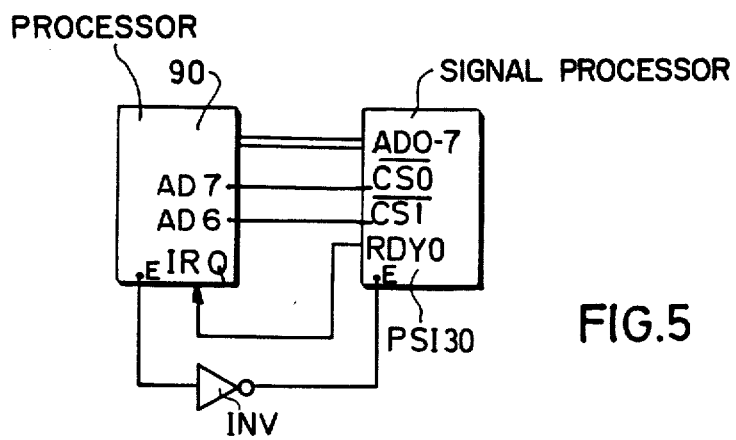
FIG. 5 represents a fourth example of a hierarchical structure according to the invention.

It is also possible as has been shown in FIG. 5 to connect the SLAVE section of a processor PSI30 of the invention to a standard processor 90, for example the MOTOROLA 6801. For this connection the RDY0 port of processor PSI30 is connected to the IRQ port of processor 90. The CS0 and CS1 ports are connected to the AD7-6 ports of the 6801 processor, the R/$\overline{\text{W}}$ ports are interconnected while the E ports are interconnected via an inverter INV. The slightly special connection of processor PSI11 in FIG. 3 should be noted. In fact the AD0-7 ports are connected both to the MASTER section of the processor PSI10 and to the memory 80. To enable on the one hand the generation of the address code for the memory 80 by the processor PSI11 and the exchanges between the processors PSI10 and PSI11, the processor PSI11 is put in a mode called PE (pesudo slave) while for simple exchanges the mode is called VE (true slave); cf. FIG. 2, PSI2.

It is also noted as regards processor PSI11 that the D0-7 and D-15 ports are concatenated so that 16-bit words can be exchanged with the memory 80 also organized for this purpose in 16-bit words. In order to put the processor in PE or VE mode and for the concatenation of the D0-7 and D8-15 ports, an instruction is transmitted by the BUSI line which, once decoded and recorded by a circuit 82, provides the signals VPE and BCS to indicate the mode:

VPE = 0 for VE mode
VPE = 1 for PE mode
and the concatenation:
BCS = 0 D0-7, D8-15 concatenated
BCS = 1 D0-7, D8-15 separate.

In the case in which the separate BUS lines are connected to the D0-7 and D8-15 ports, Table I below gives the selection of these ports as a function of the signals CS3 and CS2.

TABLE I

| CS3 | CS2 | D0-7 | D8-15 |
|---|---|---|---|
| 0 | 0 | BZ | HZ |
| 0 | 1 | HZ | BZ |
| 1 | 0 | HZ | BZ |
| 1 | 1 | HZ | BZ | where HZ = high impedance
BZ = low impedance.

In practice it is preferable to connect the processor in PE mode to the D0-7 ports and the other processors in VE mode to the D8-15 ports so that the processor in PE mode can monopolize its AD0-7 ports without disturbing the other processors in VE mode. With reference to FIG. 2, the processor PSI4 can be in PE mode while the processors PSI2 and PSI3 are in VE mode.

In the tree architecture shown in FIG. 4, precautions must be taken when a processor in PE mode controls another processor in PE mode, this combination being able to cause blockages rising in the hierarchy. These blockages can be avoided by using "dynamic programming", i.e. during a program, we pass from VE mode to PE mode and vice-versa. The process in PE mode which takes the initiative in verifying, according to a procedure described hereinafter, the availability of the BAL of the processor which is connected to it in PE mode, puts itself into VE mode. Thus it will no longer be able to be interrupted by the processor in MASTER mode to which it is connected.

Figure 6:
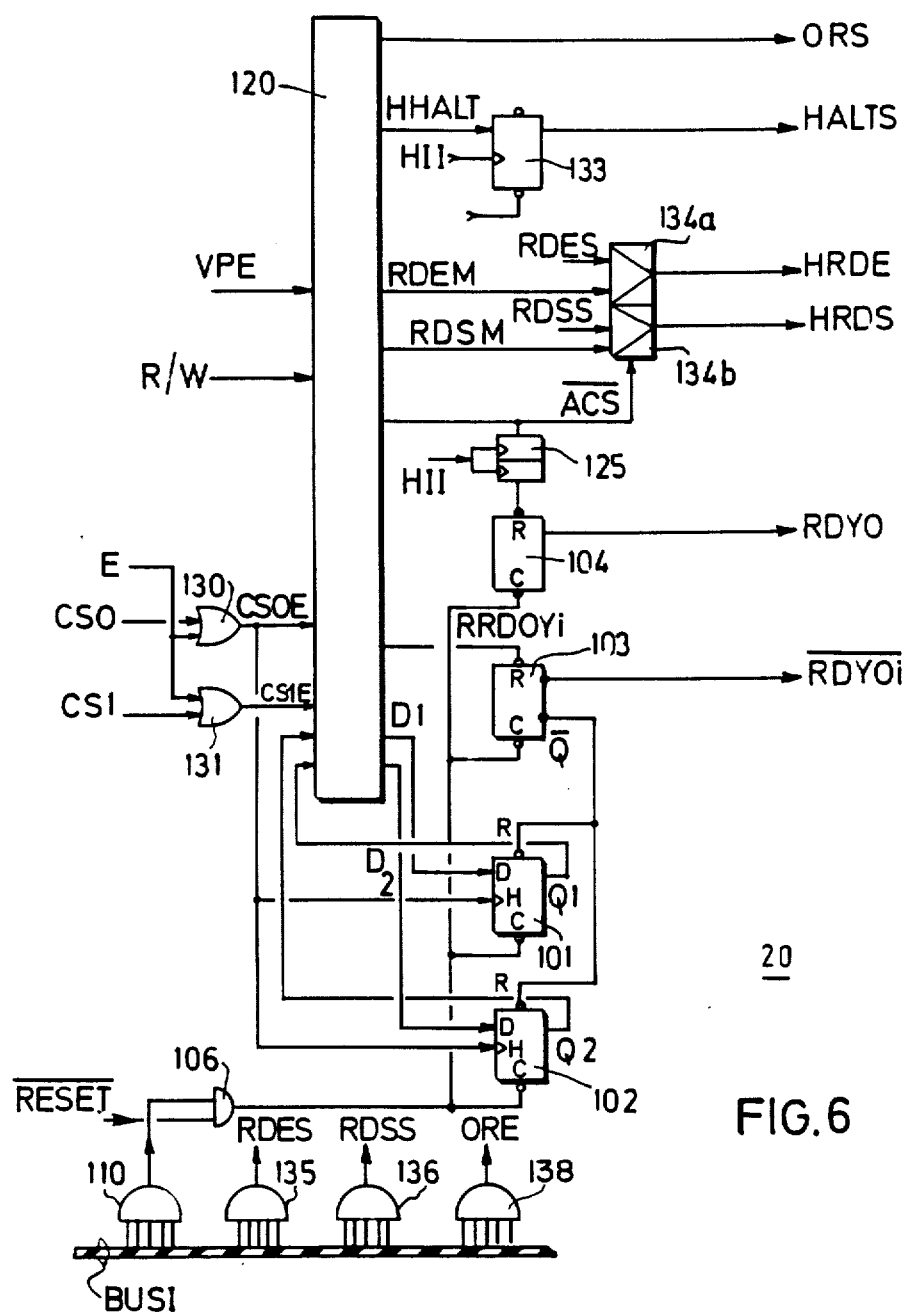
FIG. 6 represents the detailed embodiment of the sequential control circuit.

The sequential control circuit is shown in detail in FIG. 6. It comprises firstly two D type flip-flops 101 and 102 which provide the signals Q1 and Q2 at their outputs, the values of these signals defining therefore the states of the sequential circuit according to Table II below.

TABLE II

| Q1 | Q2 | State reference | Comments |
|---|---|---|---|
| 0 | 0 | α | The mailbox (12,14) is free and therefore available to the master circuit. |
| 0 | 1 | β | The mailbox is effectively connected externally to the master circuit |
| 1 | 0 | | Illegal state |
| 1 | 1 | γ | Mailbox is connected internally to the processing unit 10. |

Two other D-type flip-flops 103 and 104 respectively define the signal RDYO and a signal $\overline{\text{RDYOi}}$. The flip-flops 101, 102, 103 and 104 can be set to "0" by a signal coming from an "AND" gate 106. This two-input gate 106 receives on one of its inputs a $\overline{\text{RESET}}$ signal made active when the processor is started, and on the other input the output signal of an instruction decoder 110 connected to the BUSI line; thus by a certain instruction JJO it is possible to give the value "0" to the value RDYO and also to the other values $\overline{\text{RDYOi}}$, Q1 and Q2. The flip-flops 101 and 102 can be set to "1" by the signal at the output $\overline{\text{Q}}$ of flip-flop 103, i.e. the signal RDOYi. The D inputs of flip-flops 101 and 102 respectively receive signals D1 and D2 produced by a programmed logic circuit 120; this circuit also produces a signal RRDOYi for setting flip-flop 103 to "1". For setting flip-flop 104 to "1", a signal $\overline{\text{ACS}}$ is applied to the R input of this flip-flop via a delay unit 125, having a delay equal to the duration of two instructions said delay being fixed by a clock signal HII of which the period is equal to the duration of one instruction. The switchover inputs H of flip-flops 101 and 102 are connected to the output of an OR gate 130 having two inputs of which one receives the signal $\overline{\text{CS0}}$ and the other signal E. The output signal CS0E of this gate is also used by circuit 120. A signal CS1E also used by circuit 120 is formed by another OR gate 131 which receives on its two inputs the signals $\overline{\text{CS1}}$ and E.

A fifth D-type flip-flop, referenced 133, the clock signal inputs of which receives the signal HII provides the HALTS signal. The D input of flip-flop 133 receives a signal HHALT coming from circuit 120. A double two-state multiplexer, 134a and 134b, provides on its two outputs the signals HRDE and HRDS. The signals HRDE and HRDS are identified, when the multiplexer is in its first state, with the signals RDES and RDSS coming from the two instruction decoders 135 and 136 respectively and are identified with the signals RDEM and RDSM when the multiplexer is in its second state. It is the signal $\overline{ACS}$ that determines the state of the multiplexer 134a, 134b. A decoder 138 provides the signal ORE.

Circuit 120 is wired to carry out the following logic operations:

$$ORS = \overline{ACS} + CS0E + CS1E + R/\overline{W}$$

$$HHALT = VPE.\overline{Q1}.Q2 \text{ ps}$$
$$RDEM = CS0E + CS1E + \overline{ACS} + R/\overline{W}$$

$$RDSM = CS0E + CS1E + \overline{ACS} + R/\overline{W}$$

$$\overline{ACS} = \overline{Q1}.Q2$$

$$\overline{D1} = \overline{Q1}.\overline{Q2} + \overline{Q1}.Q2.\overline{CS0E}.\overline{CS1E} + Q1.\overline{Q2}$$

$$\overline{D2} = \overline{Q1}.\overline{Q2}.\overline{CS0E}.CS1E + Q1.\overline{Q2}$$

$$\overline{RRDYO_i} = \overline{CS0E}.CS1E.\overline{Q1}.Q2$$

Figure 7:
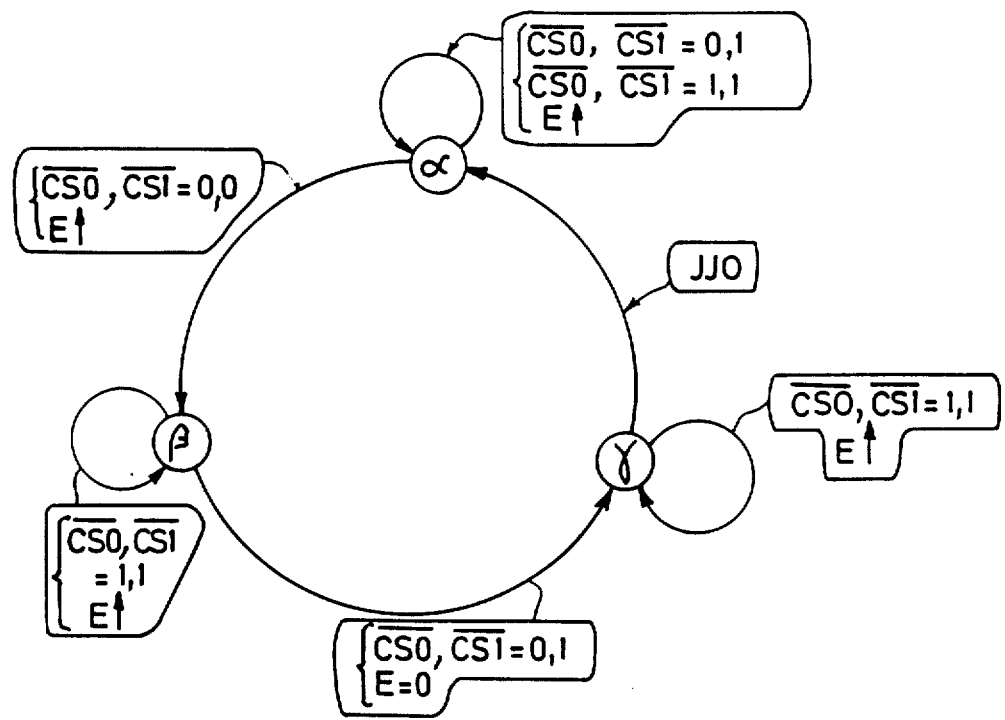
FIG. 7 is a diagram representing the states of the sequential circuit in FIG. 6.

The sequential circuit 20 has three stable stages $\alpha$, $\beta$ and $\gamma$ (see Table II) and this is represented in FIG. 7.

Figure 8:
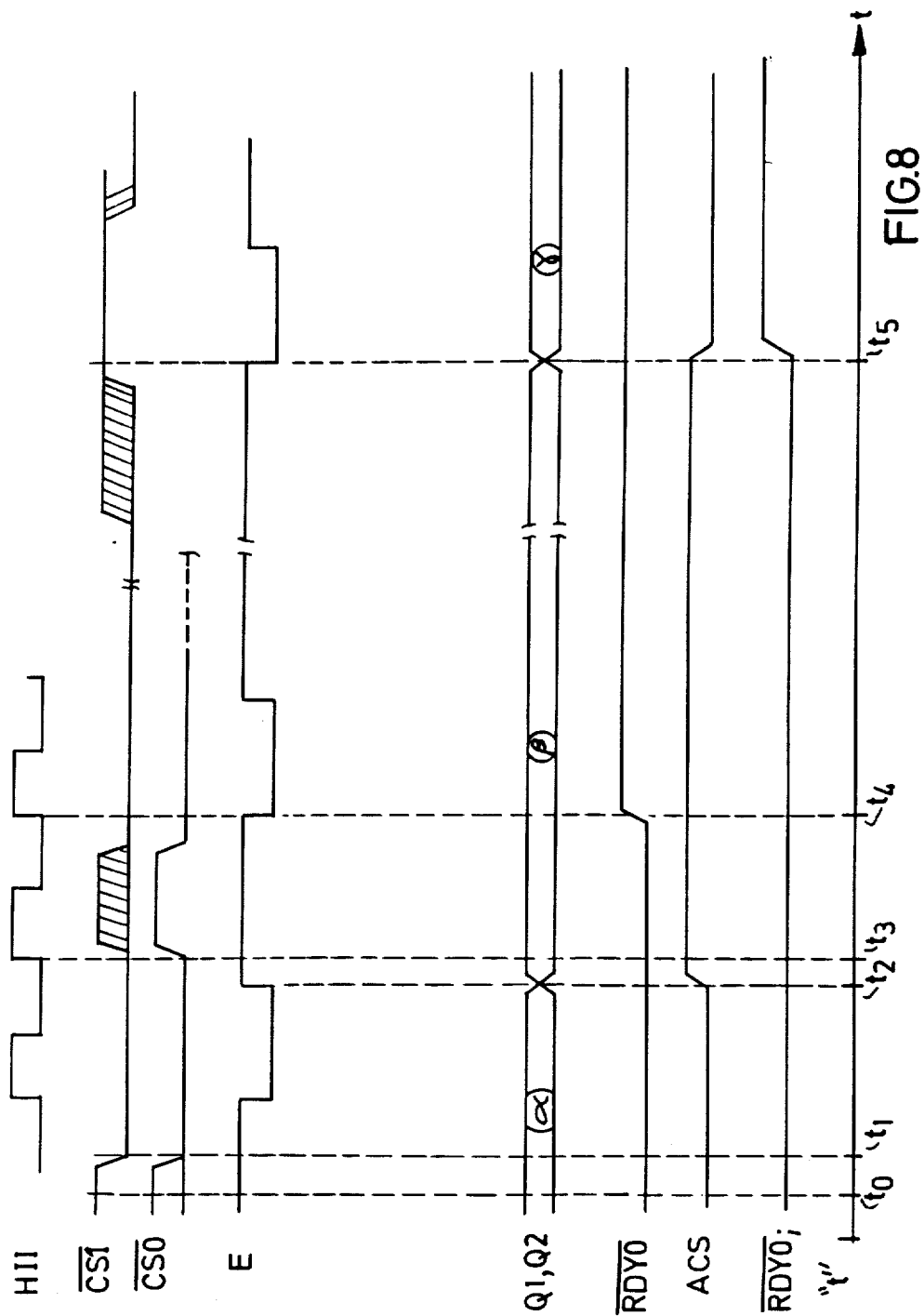
FIG. 8 is a timing diagram for connection mode VE.

The circuit 20 is put into the "$\alpha$" state by an instruction JJO carried by the BUSI line decoded by the decoder 110; this causes the resetting to zero of the flip-flops 101, 102, 103 and 104; we therefore find ourselves at time t0 in FIG. 8. To make the sequential circuit 20 go from the $\alpha$ state to the $\beta$ state two conditions must be fulfilled: it is necessary that the signals $\overline{CS1} = \overline{CS0} = 0$ on the one hand, which occurs at time t1 in FIG. 8, and that there is a rising transition of the signal E on the other hand, which occurs at time t2. The signal $\overline{ACS}$ takes the value "1" which, after two rising edges of the signal HII occurring at times t3 and t4 makes the signal RDYO take the value "1" (at t4 therefore). The signal detected by the master indicates to the master that it can then transmit data to and receive data from the slave. After this data exchange the master circuit sends the signal $\overline{CS0}, \overline{CS1} = 0, 1$ which occurs at time t5 validated by the value "0" of signal E; the signal RDYOi therefore takes the value "1" and the signal RDYO takes the value "0"; access is then given to the processing unit of the SLAVE section. The sequential circuit 20 is designed such that the states $\alpha$, $\beta$ and $\gamma$ are stable no matter what the unforeseen values of the signals $\overline{CS0}$ and $\overline{CS1}$ may be. Thus if at the state $\alpha$ the signals $\overline{CS0}, \overline{CS1} = 0,1$ or $\overline{CS0}, \overline{CS1} = 1,1$ and at the rising edge of E, we remain in the $\alpha$ state. If in state $\beta$ the signals $\overline{CS0}, \overline{CS1} = 1,1$ at the rising edge of E, we remain in this stage $\beta$. If in state $\gamma$, we are in the previous circumstances, we remain in the $\gamma$ state.

Figure 9:
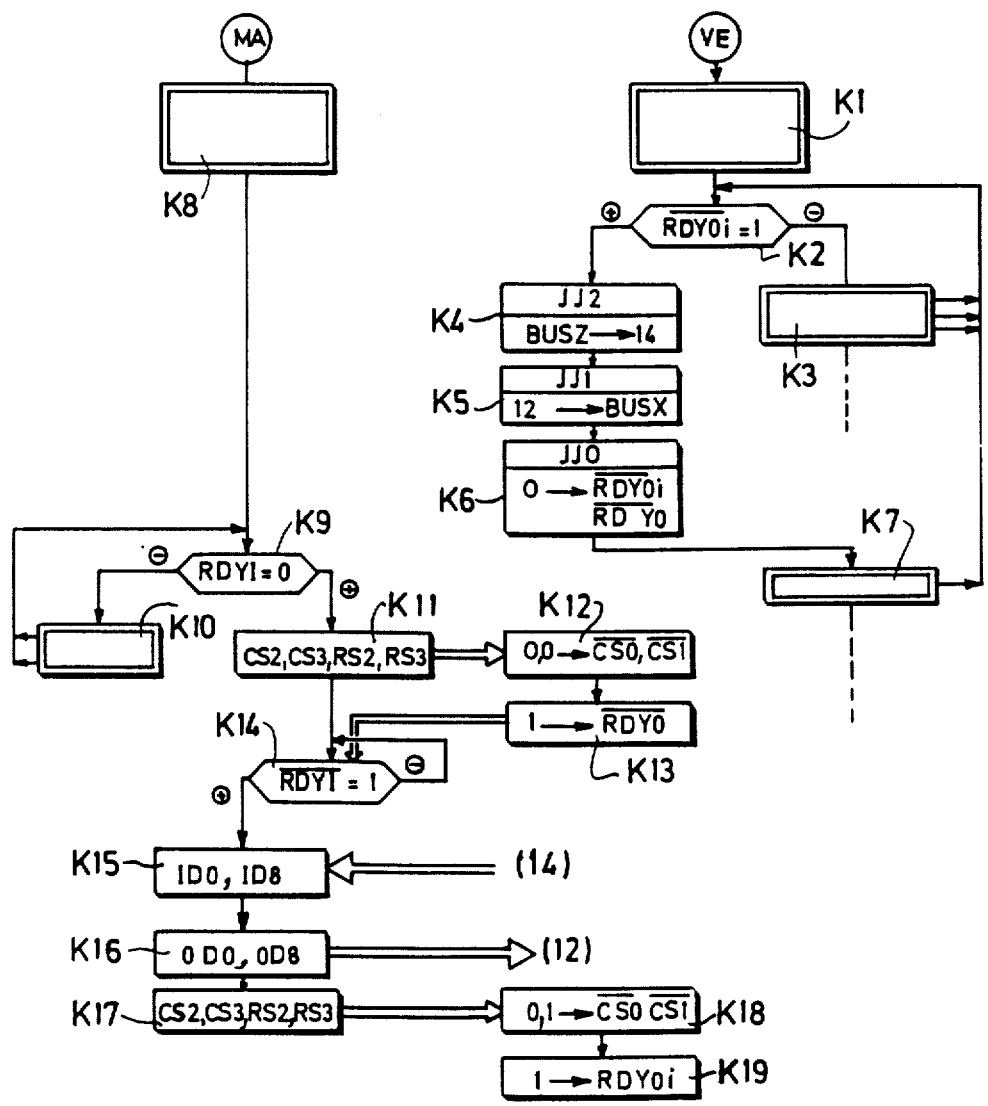
FIG. 9 is a flowchart representing the exchanges between a master circuit and a slave section in mode VE.

FIG. 9 shows a flowchart explaining the data exchange between a master circuit and a slave circuit in the VE (true slave) mode. This flowchart includes various boxes bearing references beginning with the letter K. Box K1 represents an entire signal processing program carried out by the VE circuit and during this processing it is considered useful to communicate with the master circuit; therefore data must be entered into and read from the "mailbox" registers. To do this the value of the signal $\overline{RDYOi}$ is tested by software means (Box K2). If this is not equal to "1" the mailbox is not available and another process is carried out, indicated by Box K3, in which branches are provided to Box K2. If the value $\overline{RDYOi} = 1$, register 14 is then loaded by three successive instructions JJ2 (Box K4) and register 12 is read by three successive instructions JJ1 (Box K5); then, by instruction JJO we force signals $\overline{RDYO}$ and $\overline{RDYOi}$ to "0". The VE circuit can continue to execute other programs, which is indicated by Box K7 and in these programs a return to Box K2 is not excluded. The master circuit executes, on its side, a processing program represented by Box K8. If there is need to communicate with a slave circuit it tests the value of the signal $\overline{RDYI}$ (0, 1, 2) (Box K9), by software, which is allocated to this slave circuit; this signal is then represented by $\overline{RDYI}$ in this box K9. If this signal is not equal to "0" this signifies that on the SLAVE circuit side the mailbox is not available; the master circuit can therefore carry out another or continue the same program (Box K10). If the signal $\overline{RDYI}$ is equal to "0" then we produce (Box K11) by software, by sending a code on the BUSAD line in order to obtain appropriate signals, CS2, CS3, RS2 and RS3 which, on the slave circuit side result in $\overline{CS0}, \overline{CS1} = 0,0$ (Box K12); as has been seen above this causes the rising of the signal $\overline{RDYO}$ (Box K13). This rising is detected on the master side by a software test (Box K14). The master circuit considering the mailbox as a peripheral, causes the passing state of the amplifiers 32 and/or 36 by putting signals ID0 and-/or ID8 to the active state, initially reads the data contained in the mailbox (Box K15) and then, secondly, loads data (Box K16). To do this the amplifiers 34 and-/or 38 are put into the passing state by active signals OD0 and/or LD8. In Box K17, the appearance of a code formed by signals CS2, CS3, RS2 and RS3 cause on the slave circuit side a signal $\overline{CS0}, \overline{CS1} = 0,1$, Box K18, which causes the appearance of the value "1" of the signal $\overline{RDYOi}$ (Box K19) signifying that the mailbox is available to the slave circuit.

Figure 10:
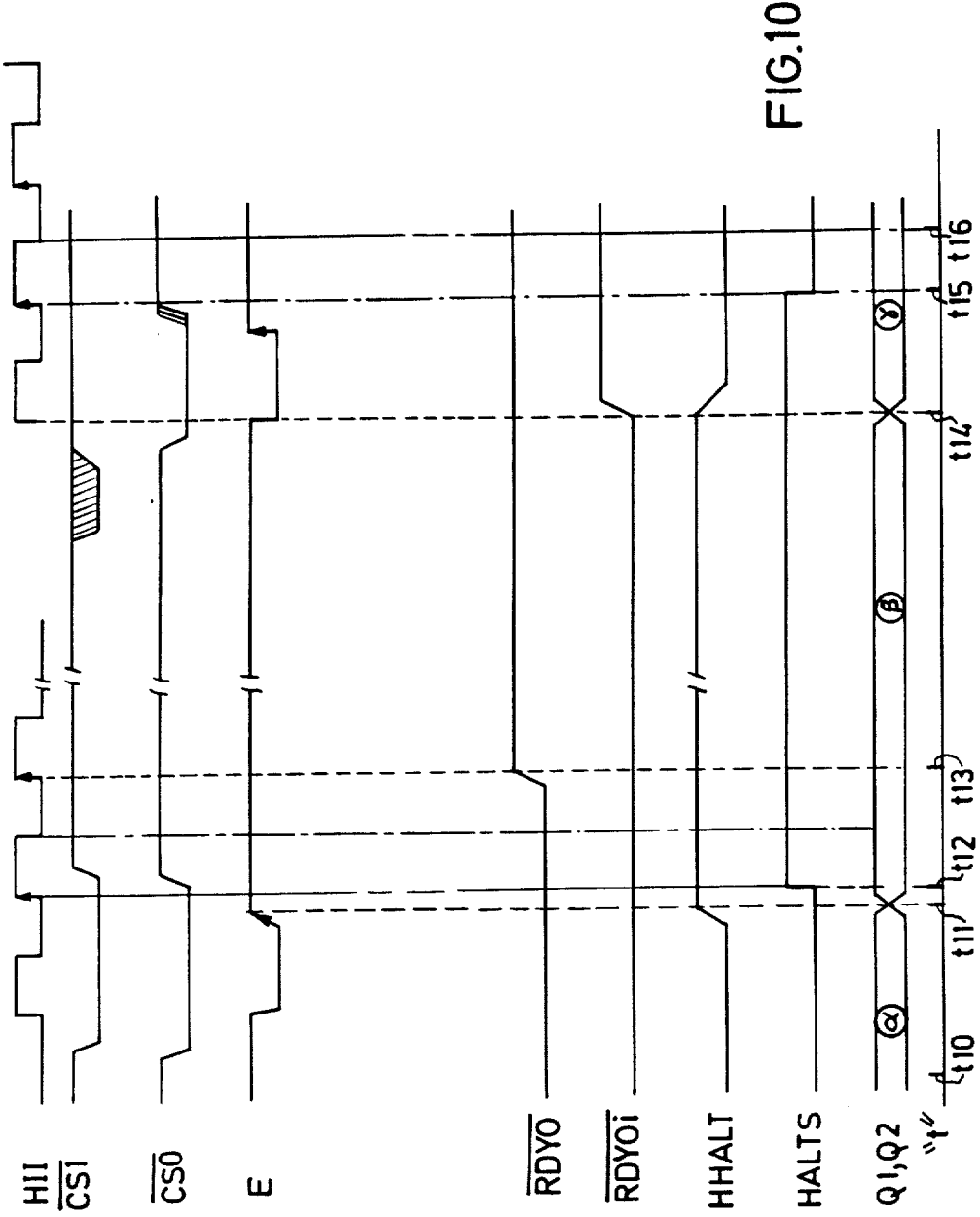
FIG. 10 is a timing diagram for connection mode PE.
Figure 11:
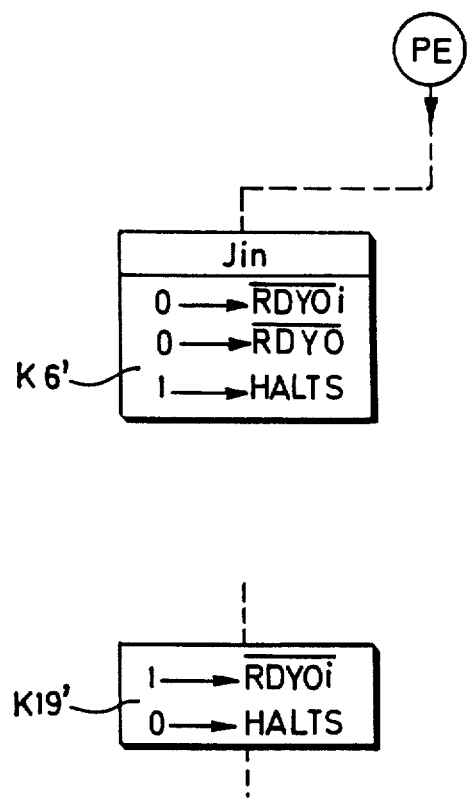
FIG. 11 represents the modifications to be made to the flowchart of FIG. 9 when in connection mode PE.

In the PE connection mode, when the mailbox is given to the master the external memory associated with the SLAVE side must no longer be addressed because this is no longer compatible with a data exchange between the master circuit and the pseudo slave; in order to avoid this incompatibility it is necessary to stop the processing unit as soon as the mailbox is connected to the master. The states $\alpha$, $\beta$, and $\gamma$ of the sequential circuit remain the same. For this PE mode, reference is made to the timing diagram in FIG. 10; we are in the state $\alpha$ at time t10; the state $\beta$ is defined as soon as the E signal takes the value "1" (time t11) after the signals $\overline{CS0}$ and $\overline{CS1}$ have taken the value 0,0; the rising of the E signal corresponds to that of the HHALT signal such that when the rising edge of the HII signal occurs at time t12, the HALTS signal at the output of the flip-flop 133 takes the value "1" which interrupts, at time t13, the operational running of the processing unit, this lasting as long as the state $\beta$ lasts. This state $\beta$ ends as soon as the signals $\overline{CS1}, \overline{CS0}$ take the values "1" and "0" validated by the "0" value of the E signal (time t14) and we thus pass to state $\gamma$. The HHALT signal takes the "0" value and the signal $\overline{RDYOi}$ takes the value "1" (as in the case of the VE connection mode). This HALT signal causes, at time t15 at which the rising edge of the signal HII occurs, the "0" value of the HALTS signal which enables the processing unit to resume operation; this unit can then access the mailbox as has been said from time t16. The flowchart showing the exchanges is represented in FIG. 11. The only changed boxes are K6 and K19 which become in FIG. 11 the boxes K6' and K19' respectively; these boxes showing the development of the HALTS signal.

Figure 12:
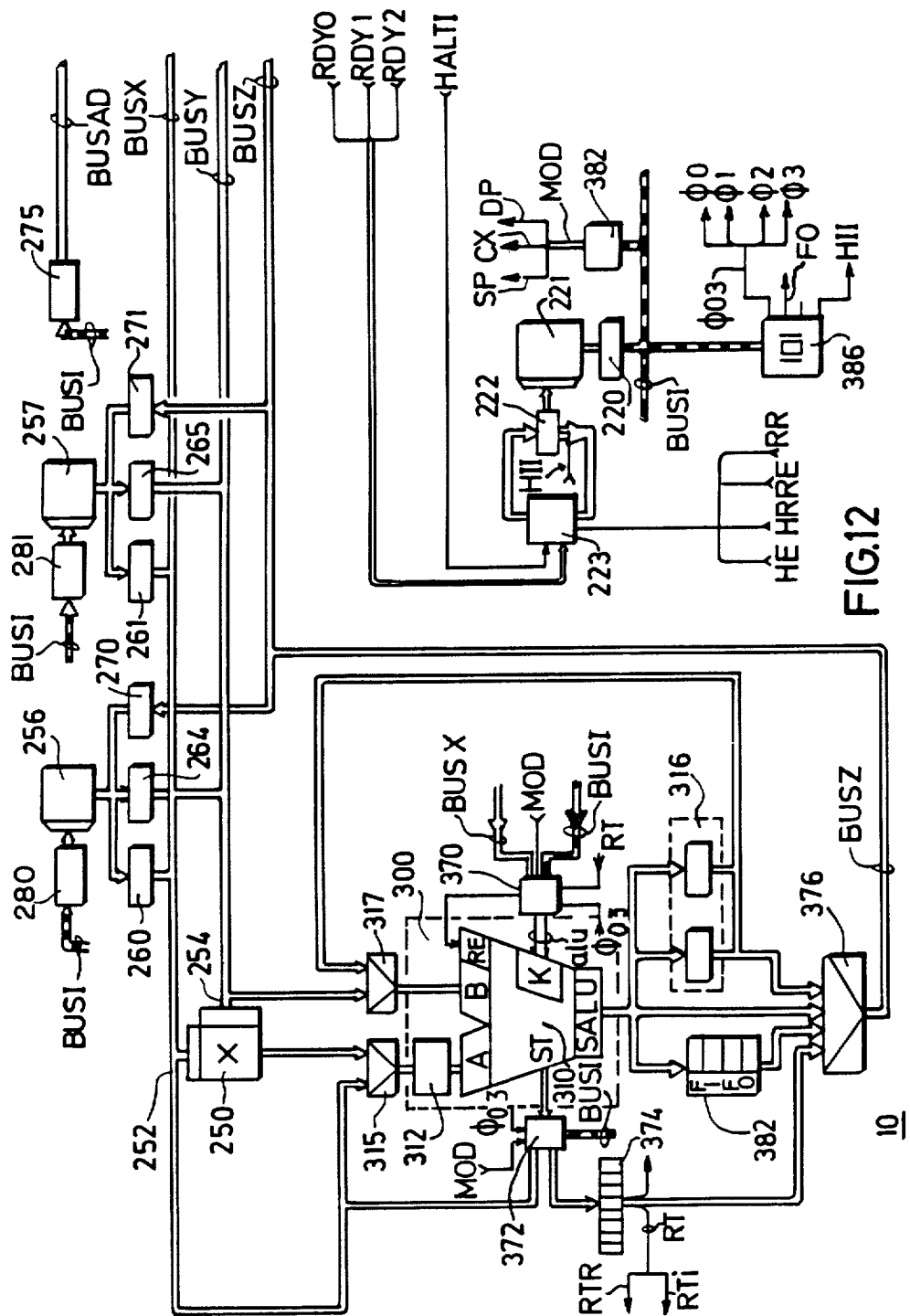
FIG. 12 represents a processing unit well suited to the processor of the invention.

FIG. 12 represents a processing unit 10 preferably used in the processor according to the invention; this unit is described in more detail in patent applications filed in conjunction with the present application in the applicant's name. The various operations to be carried out are determined by instruction codes carried by a common BUSI line connected to the output of an instruction register 220.

The instruction register 220 is connected to the output of a program memory 221 addressed by a program counter 222 the content of which can vary by one unit as a function of a clock signal HII the period of which is that of the duration of one instruction and the content of which can be totally modified by a sequencer circuit 223.

The unit 10 is built around an architecture of three common lines BUSX, BUSY and BUSZ. The BUSX line is connected in particular to a multiplication unit 250 by its input 252 for a first operand, and the line BUSY is also connected to this multiplication unit 250 by its input 254. These BUSX and BUSY lines enable the simultaneous application to this unit 250 of operands coming from random access memories 256 and 257; the data outputs of these memories are connected to the BUSX line via buffer registers 260 and 261 and to the BUSY line by means of registers 264 and 265. The data to be stored in these memories 256 and 257 comes from buffer registers 270 and 271 respectively, both fed from the BUSZ line. The address codes of these memories 256 and 257 come from address pointers 280 and 281 having a structure described in the U.S. patent application filed in the name of the assignee under Ser. No. 711,544, filed Mar. 13, 1985, presently pending and also in patent application Ser. No. 765,020, filed Aug. 12, 1985, presently pending, filed in conjunction with the present application. A third pointer 275 has also been provided used in particular for addressing an external random access memory when the processor is in the pseudoslave mode PE. The processing unit 10 includes an arithmetic and logic unit 300 able to operate, like the multiplication unit 250, in different modes of calculation (real, complex and single accuracy modes); the patent application filed at the same time as the present application can be consulted on this subject. This unit 300 is formed from an arithmetic and logic unit 310 including an operand input A connected to the output of a decoding unit 312 (barrel shifter) the input of which is connected either to the output of the multiplication unit 250 or to the BUSX line, the choice of this connection being determined by the setting of a multiplexer 315. The operand input B can be connected either to the BUS line or to the output of a set of accumulators 316, the choice being determined by the setting of a multiplexer 317. In order to operate in the different calculating modes, a borrow management circuit 370 is provided to supply the adequate borrow to the RE input of unit 310. This unit determines the "alu" control code to be applied to the input K of unit 310 so that the various carried operations proposed by the instruction codes carried on the BUSI line are executed; a status register management circuit 372 supplies the data to a status register 374. A multiplexer 376 connects on the BUSZ line data coming either from register 374 or from the SALU output of unit 310, or from the set of accumulators 316 or from the output of a memory 382 of First In First Out (FIFO) type. The unit also includes a mode detector 382 connected onto the BUSI line to provide on one of the wires SP, CS and DP a signal indicating that we are operating in real, complex and double accuracy mode respectively. This set of signals grouped in a set of MOD wires is applied to the circuits 370 and 372 so that the management of the control of unit 310 and that of the register 370 can be carried out appropriately. Similarly, a clock circuit 386 provides various signals $\phi_i$ for the control of various circuits and in particular circuits 370 and 372.

The sequencer circuit 223 receives the signals $\overline{RDY0}$, $\overline{RDY1}$ and $\overline{RDY2}$ which are tested by test instructions provided in the program contained in the memory 221. The HALTS signal stops the operation of the unit 10 in a conventional way. The program counter 222 is fixed and the processor executes a special NOP program.

Figure 13:
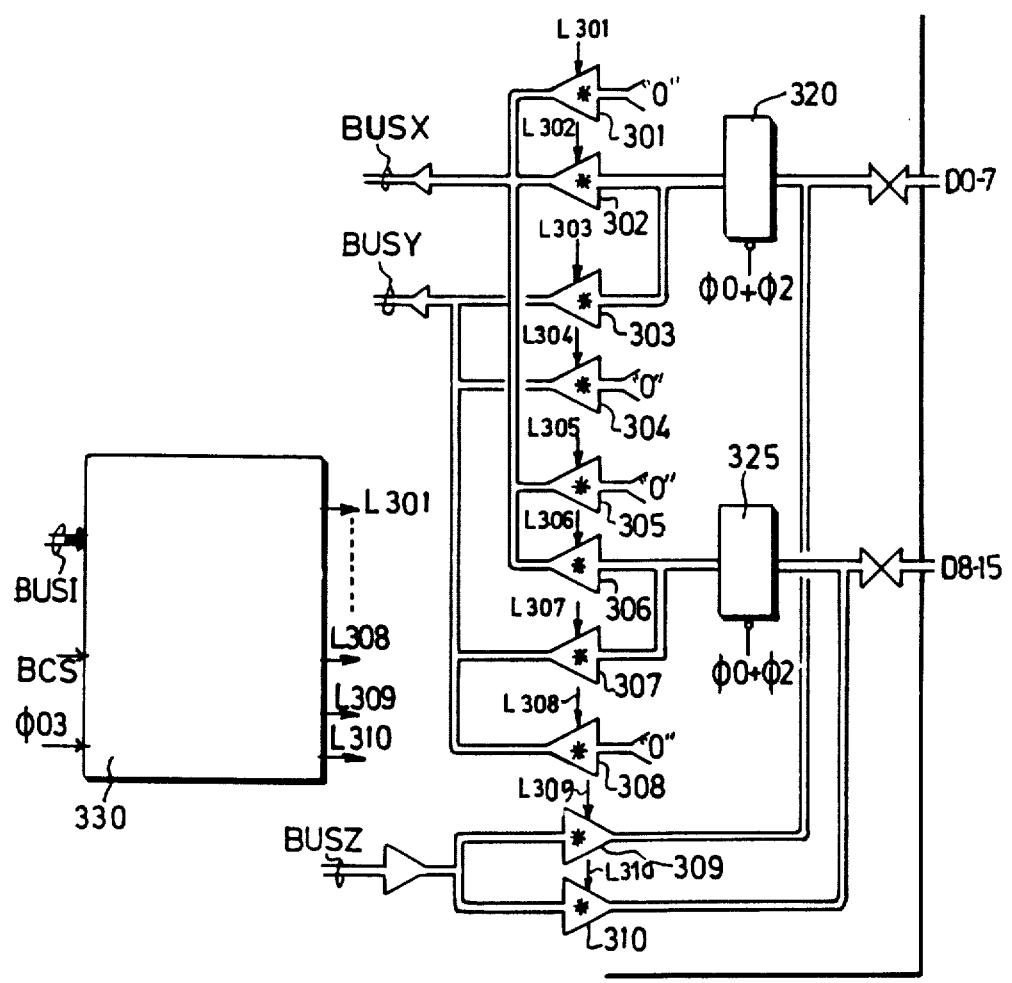
FIG. 13 represents the connections between this processing unit in FIG. 12 and the ports to the exterior.

FIG. 13 shows how the D0-7 and D8-15 ports are connected to the common BUSX, BUSY and BUXZ lines. These different lines transmit 16-bit binary words. The data arriving at ports D0-7 and D8-15 can be directed either onto line BUSX or onto line BUSY. Similarly the data coming from line BUSZ can be transmitted to ports D0-7 and/or D8-15. For this there has been provided a number of three state amplifiers 301, 302, . . . 310 working in conjunction with two transfer registers 320 and 325 the inputs of which are connected respectively to the D0-7 and D8-15 ports. The output of register 320 is connected to the inputs of amplifiers 301 and 302 while the output of register 325 is connected to the inputs of amplifiers 306 and 307. The signals at the inputs of amplifiers 301 and 308 are zeros. The BUSX line is connected to the outputs of amplifiers 301, 302, 305, and 306, the BUSY line is connected to the outputs of amplifiers 303, 304, 307 and 308. The ports D0-7 and D8-15 are respectively connected to the outputs of amplifiers 309 and 310 of which the inputs are connected to the BUSZ line. The transfer registers are controlled by the signals $\phi_0 + \phi_2$ of a control circuit 330 which, from data from the BUSI line, from the signal BCS and the signals $\phi_0 + \phi_2$ of a control circuit 330 which, from data from the BUSI line, from the signal BCS and the signals $\phi_{03}$, produces the commands to the passing or blocked state L301 to L311 for the amplifiers 301 to 311. The D0-7 and D8-15 ports can be separate and the selection is made by the different addresses (see Table I). It is important to note that in the latter case, the D0-7 port is always connected to the least significant bits of BUSX, BUSY, or BUSZ and the 8 most significant bits are forced to zero by the three state amplifiers 301, 304, when the D0-7 ports are to be connected onto the BUSX and BUSY lines respectively. In the same way, the D8-15 port is always connected to the most significant bits of BUSX, BUSY, or BUSZ and the amplifiers 305, 308 ensure a zero level on the least significant bits of the BUSX and BUSY lines respectively.

Table III below summarizes the low impedance passing commands of the three state amplifiers 301 to 310. It should be noted that a zero "0" level on the control of an amplifier puts it into the low impedance state.

TABLE III

| | 301 | 302 | 303 | 304 | 305 | 306 | 307 | 308 | 309 | 310 |
|---|---|---|---|---|---|---|---|---|---|---|
| (1) D0-7 and D8-15 concatenated = D0-15 | | | | | | | | | | |
| D0-15 on BUSX | 1 | 0 | 1 | 1 | 1 | 0 | 1 | 1 | 1 | 1 |
| D0-15 on BUSY | 1 | 1 | 0 | 1 | 1 | 1 | 0 | 1 | 1 | 1 |
| BUSZ on D0-15 | 1 | 1 | 1 | 1 | 1 | 1 | 1 | 1 | 0 | 0 |
| (2) D0-7 and D8-15 separate | | | | | | | | | | |
| D0-7 on BUSX | 0 | 0 | 1 | 1 | 1 | 1 | 1 | 1 | 1 | 1 |
| D8-15 on BUSX | 1 | 1 | 1 | 1 | 0 | 0 | 1 | 1 | 1 | 1 |
| D0-7 on BUSY | 1 | 1 | 0 | 0 | 1 | 1 | 1 | 1 | 1 | 1 |
| D8-15 on BUSY | 1 | 1 | 1 | 1 | 1 | 1 | 0 | 0 | 1 | 1 |
| BUSZ on D0-7 | 1 | 1 | 1 | 1 | 1 | 1 | 1 | 1 | 0 | 1 |
| BUSZ on D8-15 | 1 | 1 | 1 | 1 | 1 | 1 | 1 | 1 | 1 | 0 |

Figure 14:
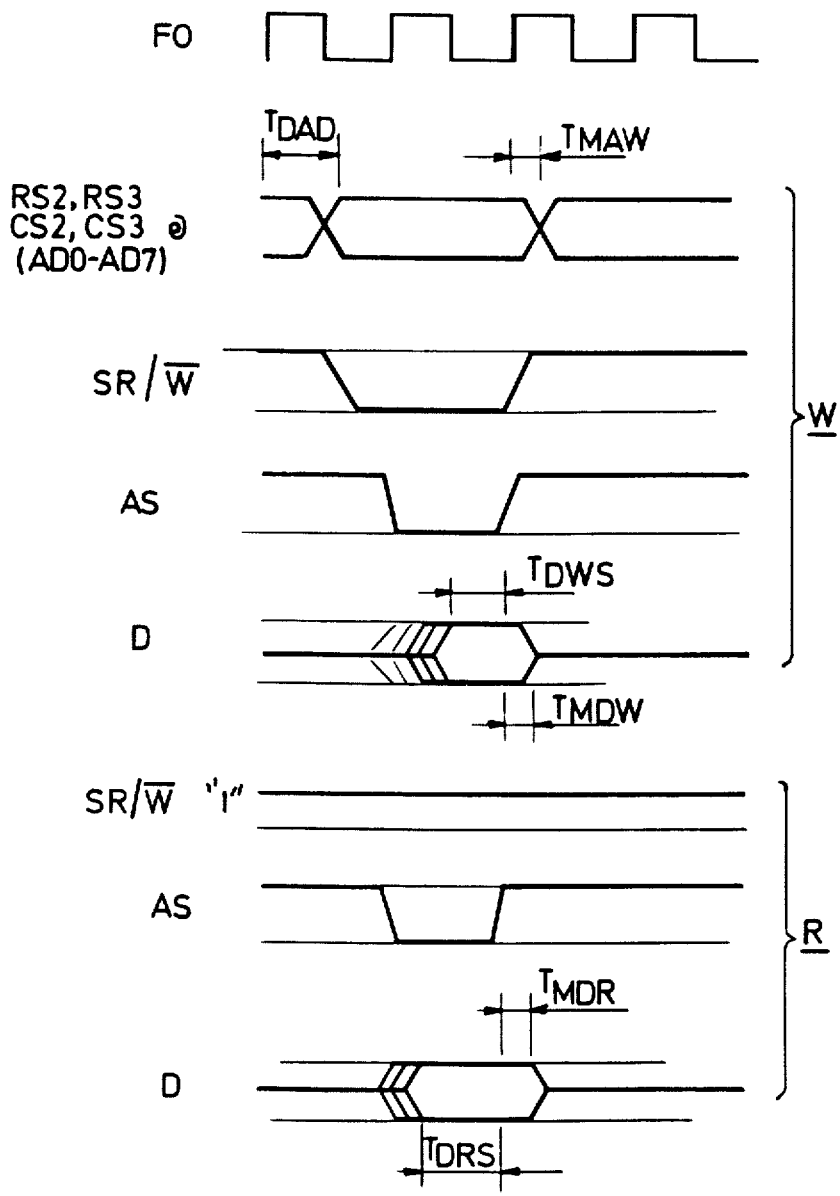
FIG. 14 shows a timing diagram of the exchanges on a line where the processor is the master.
Figure 15:
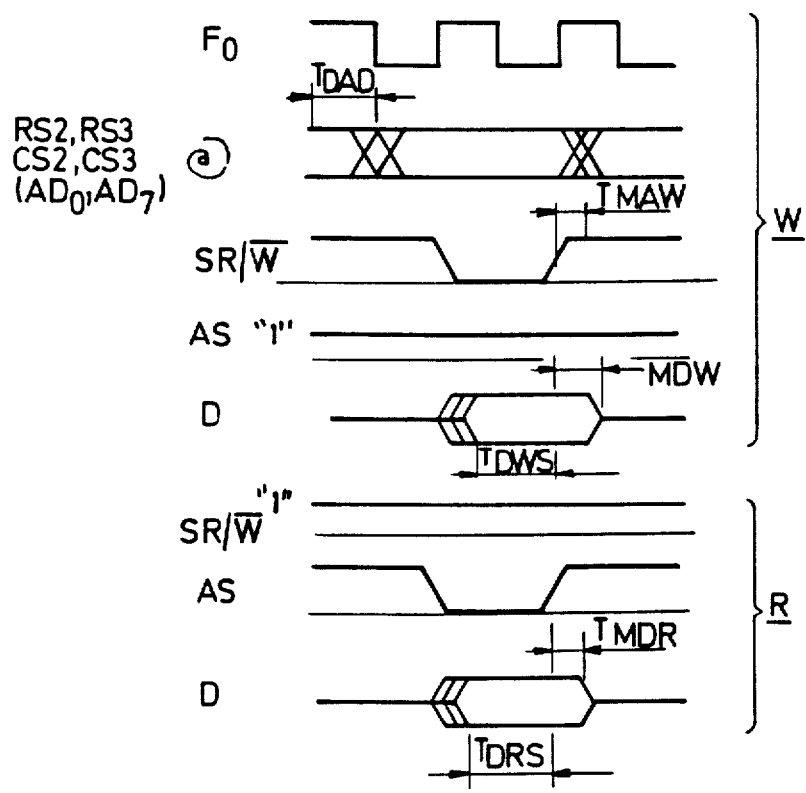
FIG. 15 shows a timing diagram of the exchange with a memory.

FIG. 14 shows a timing diagram of the various signals of the master BUS, i.e. connected to the D0-7 and/or D8-15 ports. In $\overline{W}$ the write signals are represented and in R, the read signals, It is noted that the addresses are validated by the zero state of the AS signal and the signal SR/$\overline{W}$ indicates the direction of transfer. This diagram is valid when a processor exchanges data with another processor. But, when a processor exchanges data with an external memory, the diagram is slightly different. This change is necessary in order to ensure the compatibility of the processor with the external memory without external elements. This timing diagram is shown in FIG. 15. The differences with respect to the previous one are as follows:

A-SR/$\overline{W}$ is synchronized by the second rising edge of F0

B-AS does not go to "0" for a write.

Table IV below gives the definitions of times shown in FIGS. 14 and 15.

TABLE IV

| Time | Description | MIN | MAX |
|---|---|---|---|
| $T_{DAD}$ | Address access time | | 40 ns |
| $T_{MAW}$ | Holding WE addresses high | 5 ns | |
| $T_{DWS}$ | Datum stable at WE high | 30 ns | |
| $T_{MDW}$ | Holding We data high | 5 ns | |
| $T_{DRS}$ | Datum stable at AS high | 35 ns | |
| $T_{MDR}$ | Holding AS data high | 5 ns | |

A special instruction transmitted by the BUSI line is provided so that the processor can connect with another processor or with an external random access memory.

It is appropriate to note that the internal memories 256 and 257 can be used in parallel with the external memory. This enables a reduction in the execution time of certain algorithms.

Figure 16:
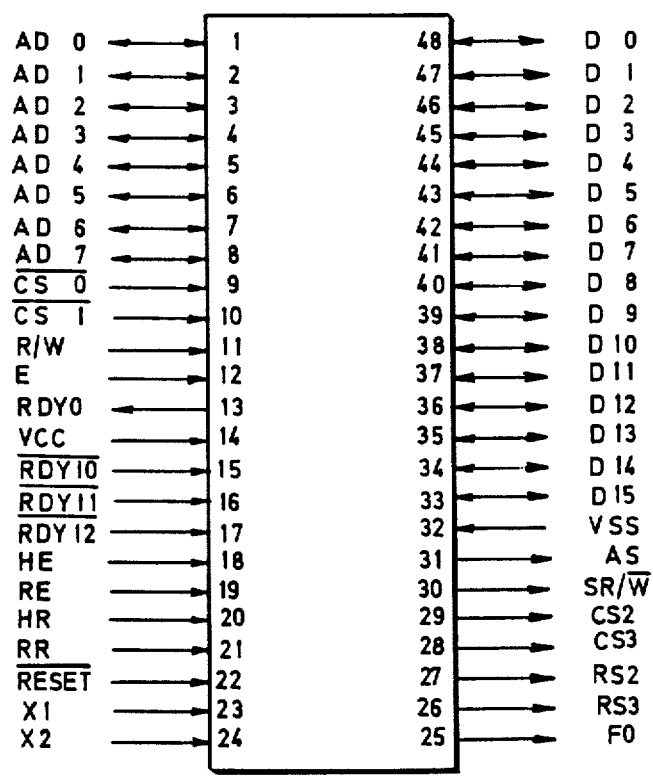
FIG. 16 shows the processor and its 48 pins.

FIG. 16 shows the 48 pins of the processor of the invention. Pins VCC and VSS are those to which the supply voltage is connected; X1 and X2 are the pins for connecting the quartz and the signal F0 is derived from this quartz. The presence of pins HE, HR, RE and RR will be noted; because of these pins is is possible to record in the respective registers falling transitions for example. Each of these registers is reset to zero after a test by the sequencer 223 to which these pins are connected. It is thus possible to synchronize the running of the internal program with external clocks.

What is claimed is:

1. A signal processing module adapted to be connected to an external master signal processing circuit for data exchange, said module comprising:
   an instruction bus;
   an input data bus;
   an output data bus;
   signal processing means coupled to said instruction, input data, and output data busses for performing operations on input data signals from said input data bus to generate output data signals on said output data bus in response to instruction signals on said instruction bus;
   a slave data port and a slave control port, each for connection to said external master signal processing circuit;
   mailbox memory means coupled between said slave data port and said input and output data busses, including;
      input buffer memory means coupled between said slave data port and said input data bus for receiving and storing slave input data signals from said slave data port and selectively directing said slave input data signals to said input data bus; and
      output buffer memory means coupled between said output data bus and said slave data port for receiving and storing output data signals from said output data bus and selectively directing said output data signals to said slave data port; and
   control means responsive to control signals at said slave control port and coupled to said mailbox memory means for sequencing data exchange with said mailbox memory means by said slave data port and said input and output data busses.

2. The signal processing module of claim 1 further comprising an output address bus coupled between said signal processing means and said slave data port, bypassing said mailbox memory means.

3. The signal processing module of claim 1 further adapted to be connected to an external slave circuit for data exchange, said module further comprising:
   a master data port and a master control port each for connection to said external slave circuit; and
   selection means, including said signal processing means, responsive to said control signals at said slave control port and to control signals at said master control port for selectively actively connecting said external slave circuit to said input data bus or said output data bus.

4. The signal processing module of claim 3, wherein said signal processing module is adapted to be connected to a plurality of external slave circuits for data exchange via said master data port, said selection means further comprising means for selecting one of said plurality of external slave circuits to be actively connected to either said input or said output data bus.

5. The signal processing module of claim 4 further comprising an output address bus coupled between said signal processing means and said master control port for providing addressing signals to one of said external slave circuits via said master control port.

6. The processing module of any of claims 1-5 wherein said control means further comprises means for configuring said signal processing module to be in either of two modes while under control of said external master signal processing circuit, a "pseudo slave" mode permitting, and a "true slave" mode not permitting, the processing by said signal processing means of external data input to said master data port.

7. The signal processing module of claim 3, wherein said master data port comprises two separate data port series, isolated from each other, for connection to different ones of said external slave circuits or for concatenation of data signals.

8. The signal processing module of any of claims 1-5 and 7 wherein said control means further comprises means for configuring said mailbox memory means in one of three states:

a first state in which said input and output buffer memory means are accessible by said signal processing means, a second state, which state can be initiated by control signals from said external master signal processing circuit, for allowing exclusive access to said input and output buffer memory means by said external master signal processing circuit, and a third state in which said input and output buffer memory means may be accessed by signal processing means only when released by said master signal processing circuit.

9. The multiprocessing structure comprising the signal processing module of any of claims 3-5 and 7 wherein said external master signal processor is another substantially identical signal processing module connected by its master data port to the slave data port of the first described signal processing module.

10. The multiprocessing structure of claim 9 wherein at least one external slave circuit comprises another substantially identical signal processing module connected by its slave data port to the master data port of either of the previously described signal processing modules.

* * * * *